US005680472A

United States Patent [19]

Conant

[11] Patent Number: 5,680,472

[45] Date of Patent: Oct. 21, 1997

[54] APPARATUS AND METHOD FOR USE IN AN AUTOMATIC DETERMINATION OF PAPER CURRENCY DENOMINATIONS

[75] Inventor: James R. Conant, Brookfield, Conn.

[73] Assignee: CR Machines, Inc., Brookfield, Conn.

[21] Appl. No.: 525,498

[22] Filed: Oct. 5, 1995

Related U.S. Application Data

[63] Continuation of Ser. No. 257,723, Jun. 9, 1994, abandoned.

[51] Int. Cl.$^{6}$ .............................. G06K 9/00; G06K 9/48; G06K 9/32

[52] U.S. Cl. .......................... 382/135; 382/137; 382/199; 382/296

[58] Field of Search ..................................... 382/135, 137, 382/138, 139, 199, 227, 296; 209/534; 194/302; 345/126; 348/583; 395/137

[56] References Cited

U.S. PATENT DOCUMENTS

| | | | |
|---|---|---|---|
| 4,524,276 | 6/1985 | Ohtombe | 250/338 |
| 4,563,771 | 1/1986 | Gorgone et la. | 382/7 |
| 4,984,280 | 1/1991 | Abe | 382/7 |
| 5,021,673 | 6/1991 | Dragon et al. | 250/548 |
| 5,191,438 | 3/1993 | Katsurada et al. | 382/46 |
| 5,199,543 | 4/1993 | Kanegami et al. | 382/7 |
| 5,216,724 | 6/1993 | Suzuki et al. | 382/7 |
| 5,260,582 | 11/1993 | Danek | 356/71 |
| 5,295,196 | 3/1994 | Raterman et al. | 382/7 |
| 5,323,473 | 6/1994 | Lau | 382/48 |

*Primary Examiner*—Leo Boudreau
*Assistant Examiner*—Bipin Shalwala
*Attorney, Agent, or Firm*—St. Onge Steward Johnston & Reens

[57] ABSTRACT

A method and apparatus for use in automatic determination of the denominations of currency bills employs a light scanner to produce pixel signals representative of light pixels from bill surface portions extending across bill sides The pixel signals representative of side and top edges of the printing on the bill surface are found and used to generate a deskewed array of pixels representative of bill corner images that include the bill's denomination numbers Pixel signals indicative of light passed through bill portions enable the detection of a security thread in a bill A hierarchial technique for determining bill denominations is described

7 Claims, 10 Drawing Sheets

APPARATUS AND METHOD FOR USE IN AN AUTOMATIC DETERMINATION OF PAPER CURRENCY DENOMINATIONS

This is a continuation of application Ser. No. 08/257,723 filed on Jun. 9, 1994, now abandoned.

FIELD OF THE INVENTION

This invention relates to a method and apparatus for use in the automatic recognition of the denominations of paper currency as well as in a determination of its authenticity.

BACKGROUND OF THE INVENTION

An automatic currency identification system is described in the U.S. Pat. No. 4,179,685 to O'Maley. This patent describes a system wherein a scanner formed of a plurality of detectors observes currency bills and produces signals representative of the printing on the bill to a CPU. These signals are compared with comparable type signals stored in a memory and representative of various denominations. The scanner outputs are compared bit for bit with stored denomination signals and based on that, a decision is made as to which denomination is being scanned. The strobing of scanner elements is synchronized with bill movements. Bill skew angles and lateral positional shifts of bills can be accommodated.

Automated bill scanning machines exist in which currency bills are first mechanically registered before scanning. Such machines tend to be large to accommodate this long mechanical path.

In the International patent publication WO 91/11,778 filed Jan. 14, 1991 by the Cummins-Allison corporation and invented by Raterman, et al., a currency denomination sensing apparatus is described. This apparatus stores four separate patterns for each bill: forward, reverse, back, and front for each denomination. The patterns are then compared with the scanned pattern in a correlation technique. In U.S. Pat. No. 5,295,196 to Raterman, et al., and which issued from the same U.S. patent application, only two patterns are stored for forward and reverse scanning of bills. The ability to determine the denomination of a bill from the scanning of either front or back surfaces was apparently not possible using the technique described in the international patent publication.

Many pattern recognition and pattern comparison techniques and devices have been proposed. See for example the techniques described in U.S. Pat. Nos. 3,829,831 to Yamamoto, et al.; 3,384,875 to Bene, et al. (cross-correlation); 3,495,216 to Silverschotz; 3,182,290 to Rabinow. Articles of interest in pattern recognition appear in "Advances in Character Recognition" by J. R. Ullman from the Handbook of Pattern Recognition and Image Processing Edited by T. Young and K. Fu published by Academic Pess, Inc., 1986. Note in particular, a section dealing with correlation of an unknown pattern with reference patterns on page 210.

Although these techniques are useful, a need exists for a rapid automatic robust technique capable of recognizing currency bills in a reliable economic manner without having to mechanically align the bills prior to their scanning and independent of whether the front or back surfaces of bills are being scanned.

SUMMARY OF THE INVENTION

With the use of an apparatus and method in accordance with the invention, denominations of paper currency can be rapidly and reliably determined even while bills are moved past the bill scanning system at rates as high as or higher than one thousand per minute.

This is achieved with one technique in accordance with the invention by detecting the locations and orientation of a side edge and a top edge of the printing on each bill being moved past a scanner. Once these printing edges are determined, pixel signals representative of a deskewed image of a bill can be determined and a bill recognition scheme applied to these pixel signals.

With a technique in accordance with the invention, spaced-apart corners of bills can be scanned. Images of the printing at the bill corners can then be derived independent of skewed bill alignments. A bill's denomination can then be obtained whether or not one of the bill corners is mutilated.

With a technique in accordance with the invention, various other regions of a bill can be scanned whether it is the front or the back of a bill or along a forward or reverse direction while still enabling the determination of the bill's denomination.

In another aspect of the invention, a technique is described to detect the presence of a security thread employed within a bill by analyzing the transmittance characteristics of a bill. In the United States, such threads are placed parallel to the bill's narrow dimension and typically about an inch from one of the printing borders.

One technique for detecting the security thread involves a pair of spaced-apart sensors, each having a desired resolution and covering an area selected to assure the detection of the thread. The sensors detect light passed through the bills and pixel signals from the sensors and representative of a desired bill section along the direction of travel of the bill are stored. These pixel signals are then correlated with signals representative of a typical thread's transmittance profile and the presence of a thread derived when the correlation exceeds a preselected threshold.

With a technique in accordance with the invention, the top printing edge or border of a bill can be found for many denominations, despite the fact that these borders are not always well defined and that the bill's motion tends to smooth the pixel signals representative of the top printing edge.

One technique in accordance with the invention for determining the location and orientation of the top printing edge commences with determining the top paper edge and then proceeds by correlating pixel signals along respective down-shifted parallel lines with a bill image. The area of lines which produces the greatest change in the correlation then corresponds to the transition from a light border to the dark top printing edge of the bill.

Once the side and top printing edges of a bill have been found in the array of pixel signals obtained from the scanner, the pixel signals for a deskewed image can be derived and the bill recognition process and security thread detection implemented.

As described herein, bill recognition can be efficiently implemented by employing so-called linear discriminant functions. A hierarchial application of linear discriminant functions is then followed to more rapidly move through the bill recognition process.

It is, therefore, an object of the invention to provide a method and apparatus for scanning bills of paper currency and produce pixel signals representative of printed segments of the bills surfaces so as to facilitate the recognition of bill denominations. It is a further object of the invention to provide a method and apparatus for producing deskewed images of printed surfaces of bills for denomination determinations.

It is a further object of the invention to provide a method and apparatus of the invention for determining the genuineness of bills by detecting security threads within the bills.

It is a further object of the invention to provide a method and apparatus for use in determining the denominations of currency bills.

These and other objects and advantages of the invention can be understood from the following description of an apparatus and method in accordance with the invention as illustrated in the drawings.

DETAILED DESCRIPTION OF DRAWINGS

Figure 1:
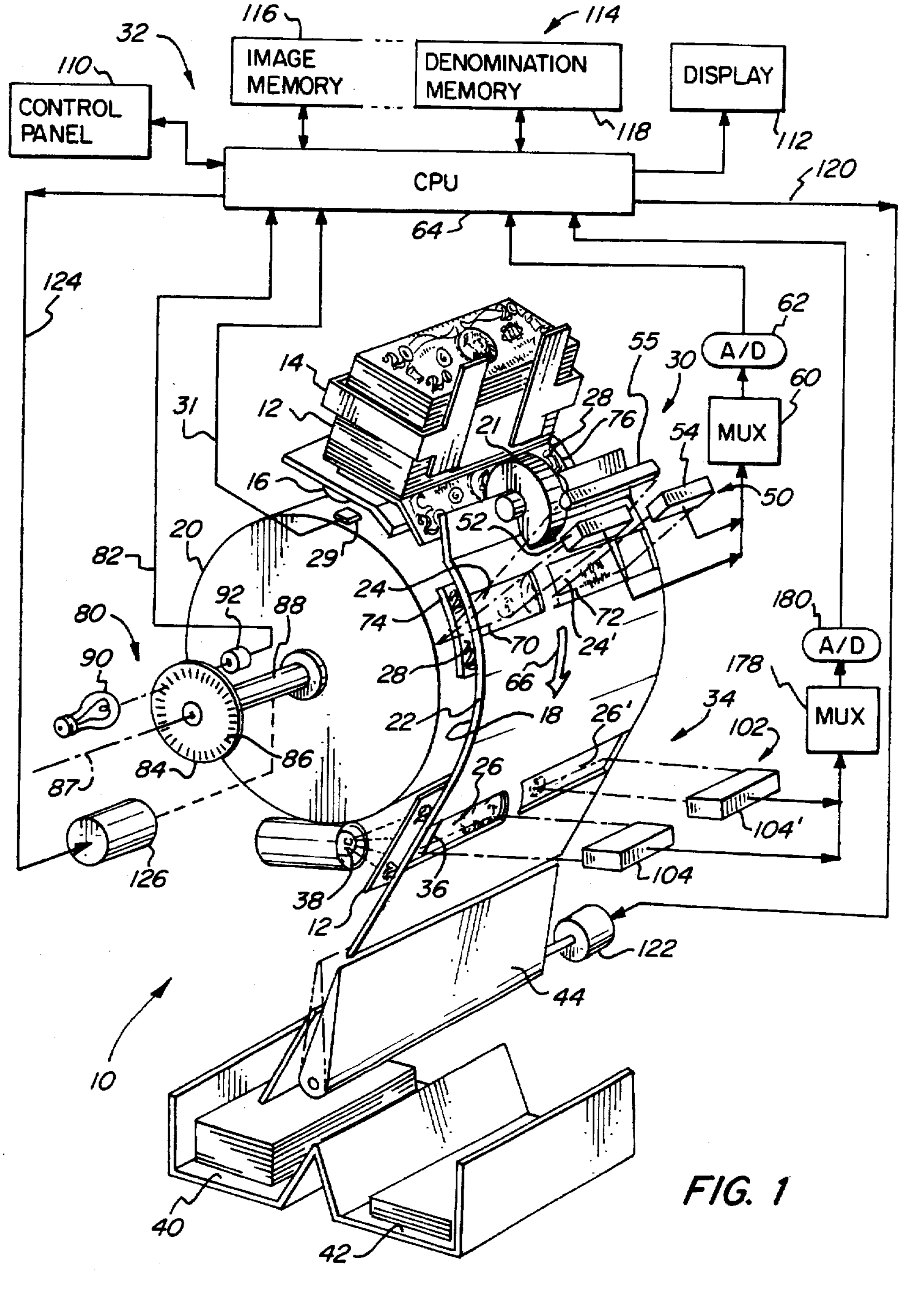
FIG. 1 is a perspective and block diagram view of a currency denomination-determining apparatus in accordance with the invention.
Figure 3:
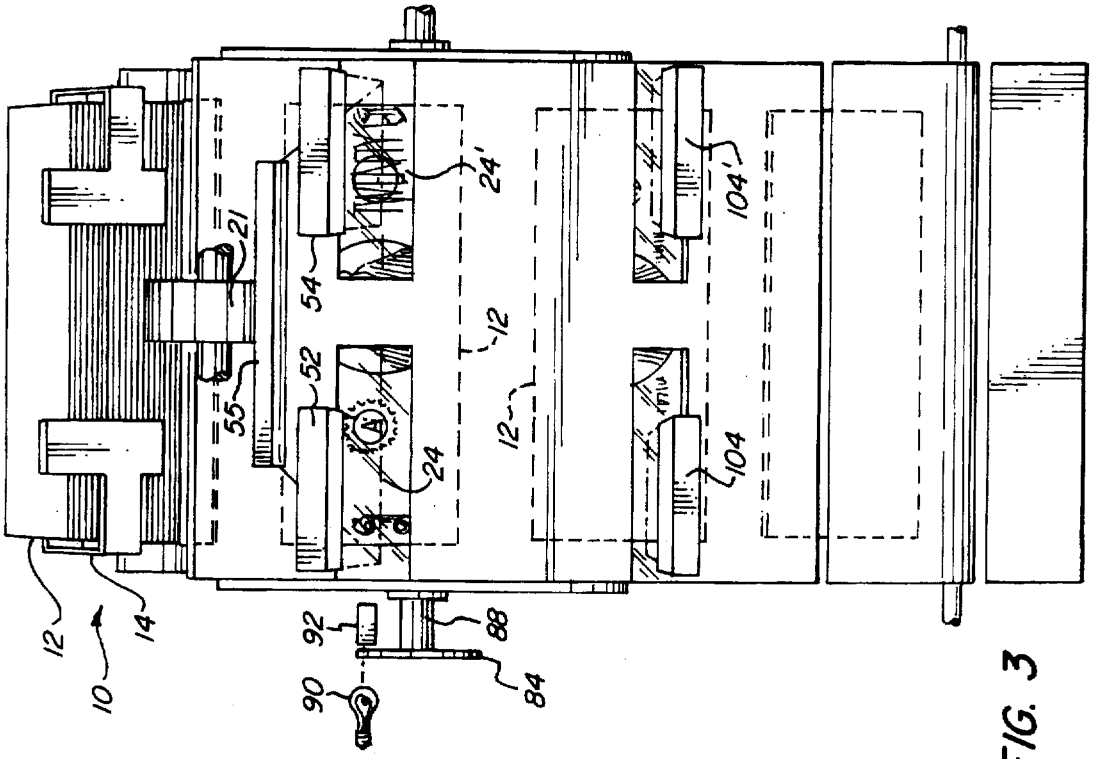
FIG. 3 is a front view in elevation of the optical and mechanical portions of the apparatus of FIG. 1.
Figure 2:
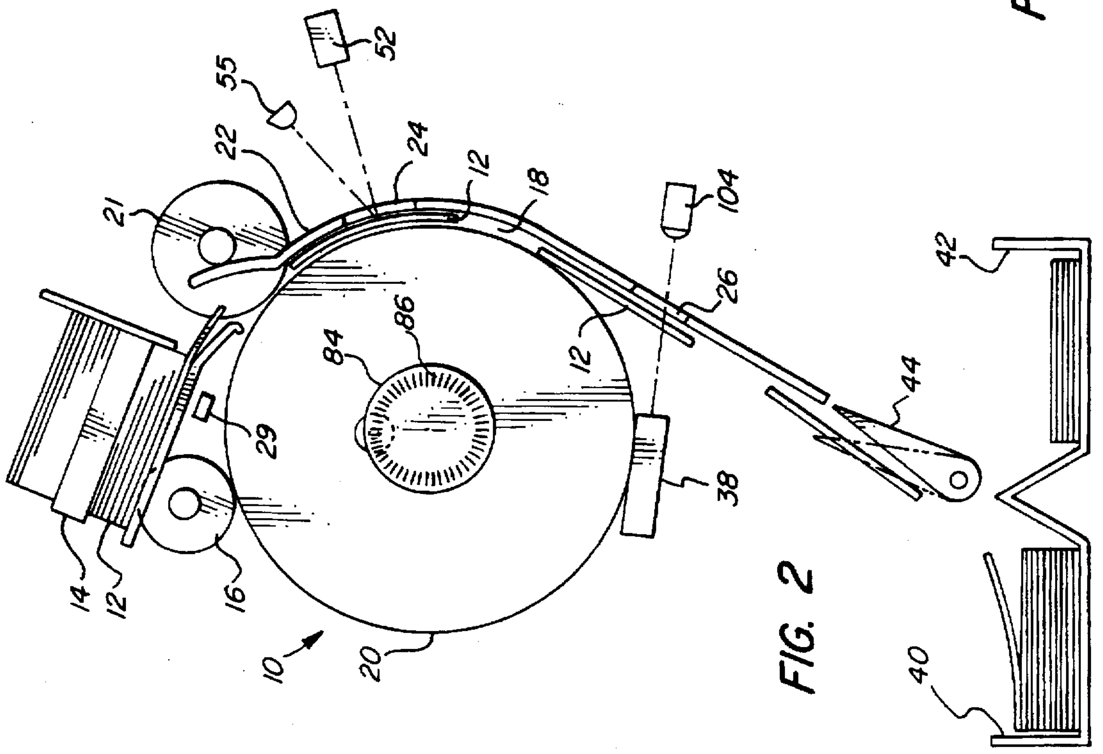
FIG. 2 is a side view in elevation of the optical and mechanical portions of the apparatus of FIG. 1.

With reference to FIGS. 1–3, a compact apparatus 10 is shown for denomination-processing of currency bills 12 loaded in a hopper 14. The bills 12 are removed from the bottom of hopper 14 with a pick-off roller 16 which sends the bills along a travel path 18 defined between a main roller 20 a free-wheeling roller 21 and a guide plate 22. Plate 22 has several optical windows 24, 24' and 26, 26' along the path 18 to enable optical viewing of the faces 28 of bills 12 transported along path 18. A sensor 29 is used to detect the presence of bills 12 in hopper 14 and supply a signal representative thereof on line 31. Sensor 29 can be optical or electro-mechanical.

Windows 24, 24' serve to enable optical scanning of bill surfaces 28 visible through the windows 24, 24' by an optical scanner 30. The output of the scanner is applied to a signal processor system 32 which should be a high speed microprocessor or a DSP chip to determine the bills denomination. The windows 24, 24' may be each approximately two inches wide and a quarter inch high. Two windows 24, 24' are used for better bill denomination recognition performance despite the presence of a dog-ear or mutilation at a bill corner.

Windows 26, 26' serves to enable transparency scanning of bills 12 for detection of a security thread 36 by an optical scanner 34 which responds to light from a source 38 after passing through a bill 12. Windows 24, 24' and 26, 26' are sufficiently closely spaced to each other, typically about a distance equal to about half the smaller dimension of a bill 12 even though, as shown in FIG. 1, a larger separation is illustrated. The larger separation is for clarity. Hence, as a bill passes windows 24, 24', it is also moving past windows 26, 26'.

While a bill moves along the travel path 18, the signal processing system 32 identifies the denomination of a bill, determines the presence of a security thread 36 and makes a decision as to the discharge path for a bill. A bill may be discharged into either of collection hoppers 40 or 42 by use of a guide switch The apparatus 10 can process bills 12 at a rapid rate of the order of 1,000 per minute or higher with a high reliability in the recognition of bill denominations. This involves employing an optical scanner 30 formed with an array 50 of light detecting elements arranged in spaced-apart sub-arrays 52, 54 to image the bill through windows 24, 24' and detect the light image emanating from bill surface 28. An elongate light source 55 is used to illuminate the bill surface 28 appearing opposite window 24, 24'. The array 50 can be formed of linear charge-coupled devices (CCD). Each sub-array 52, 54 has the capability of detecting light from individual small light object pixels on bill surface 28 and produces a pixel signal for each pixel object. The pixel signals are effectively simultaneously sampled and their respective amplitude levels converted to digital form using multiplexer 60 and an analog to digital converter 62. The digital values are entered into a processor 64. CPU 64 preferably is a fast signal processor capable of doing at least about 30 million instructions per minute.

The CCD can be a Texas instrument device which operates at a clock rate of about 500 KHz and whose output digital values are directly entered into the CPU 64. A lens assembly is employed in front of the CCD to demagnify a bill image of about 2.4 inches into an image whose length is that of a CCD sub-array 52 or 54 or about 0.32 inches. The CCD array 50 is selected and the speed of sampling is set so that a bill 12 can be scanned with a lateral resolution of the order of about 30 dpi (dots per inch) and vertically, or along the travel path 18 of bills 12 of the order of about 40 dpi with a small amount of overlap.

The digital pixel signals can be pre-processed as is well known in the art for gain and bias variations due to variations in illumination intensity, optical fidelity and CCD response as well as to take dynamic characteristics of the CCD individual light pixel sensors into account.

The operation of the scanner 30 is sufficiently fast so that in effect each sampling, occurring at a repetition rate of the order of 250 microseconds, stores pixel signals representative of a row of surface pixels lying along a scan line that is transverse to the direction of travel of bills 12 as indicated by arrow 66. The scan line can be a continuous line but in the embodiment is preferably formed of a pair of aligned spaced-apart scan line segments 70, 72 respectively optically imaged by sub-arrays 52, 54. The scan-line segments are located so as to assure scanning of bill corner portions to include bill denomination numbers near the short bill sides 74, 76 and independent of the various skew angles that a bill may have relative to the travel direction 66 and to accommodate a lateral shifting of bills. A skew angle refers to the angle that a short bill side 74 forms with respect to the travel direction 66. Such angle can arise during the feed of bills from hopper 14 and needs to be measured to effectively apply a fast classification algorithm.

When surface pixels are sampled, the digital pixel signals representative of bill scan segments 70, 72 are combined in CPU 64 and stored as a pixel scan line with appropriate designations as to whether the pixel signals represent bill surface pixels on the left side 74 or the right side 76.

The storage of pixel scan lines preferably is done so that successive pixel scan lines represents bill surface scan lines that are equally spaced from each other. This can be done by employing a shaft encoder 80 with which strobe signals are generated on a line 82 representative of equal angular increments of travel of transport roller 20 and thus also of equal travel increments of bills 12 along travel path 18. The strobe signals can be produced with an opaque mask 84 having transparent apertures 86 equally spaced around the axis 87 of the rotating shaft 88 of transport roller 20. A light source 90 and light detector 92 are placed at axial sides of mask 84 to provide the strobe pulses on line 82.

The strobe signals are in the embodiment applied to CPU 64 to enable the CPU to associate digital scan lines with equal travel increments of bills 12. Alternatively, the strobe signals could be used to synchronize the sampling and A/D conversion of the pixel outputs of the array 50.

Another feature of the invention involves the detection of a security thread 100 embedded within many currency bills. Such threads typically are about 0.05" wide and are placed parallel to a narrow bill side about 0.95 inches from the printed border. This detection is done with an array 102 of CCD's in scanner 34. The array 102 is formed of a pair of spaced-apart CCD sub-arrays 104, 104' which scan the light passed through a currency bill 12 from source 38. The pixel outputs are converted to digital format with a multiplexer 106 and A/D converter 108 as can be found on a DSP-type chip. The CCD sensors 104, 104' each have a resolution of about 64 dpi and effectively each cover an area that is about one inch wide. The digital pixel signals from the A/D converter 108 are entered into CPU 64 for further processing for the detection of the presence or absence of a security thread 100 in a bill 12 using alignment information derived from the analysis of data generated by scanner 30.

The processing of digital pixel signals by CPU 64 involves associated devices such as a control panel 110, which typically includes a keyboard, a display 112, and an appropriate memory 114. The memory 114 includes a particular segment identified as an image memory 116 containing the digital pixel signals associated with de-skewed corner images of a bill near both its left and right sides 74, 76. These stored pixel signal images are referenced with respect to the left and right edges of the printing of a bill as well as its top or longitudinal printing edge.

Memory 114 also includes a memory segment 118 for storing particular coefficient values used in linear discriminant functions associated with particular bill denominations. These are used for classifying bill images.

CPU 64 generates various outputs as a result of its signal processing. One output is applied on line 120 to actuate for example a solenoid 122 connected to operate switch 44. This diverts a bill either into hopper 40 or 42. Various other routings of denomination-identified bills can be employed. The particular switch 44 and hoppers 40, 42 are shown for illustration.

Another response to bill denomination determination can be as suggested by output line 124 which causes the interruption of the drive of transport roller 20. In such case, the signal on line 124 can activate a solenoid 126 to disengage a clutch or interrupt the power to the motor, not shown, used to rotate transport roller 20. This mode of operation for example can be used when the apparatus 10 is counting bills 12 of a particular denomination so as to halt the counting process when a bill with the wrong denomination is recognized.

Figure 4A:
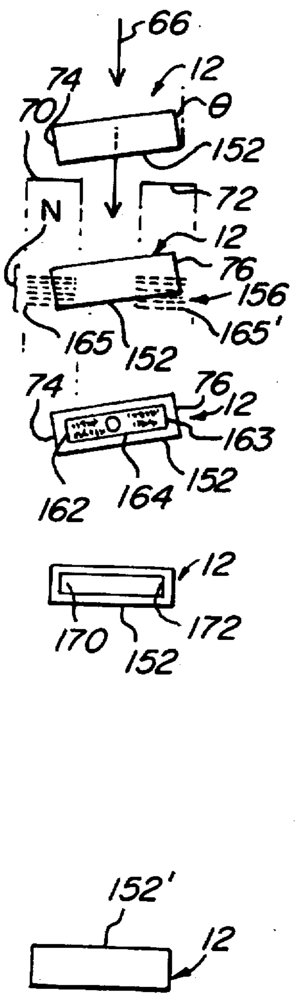
FIG. 4A is a series of schematic representations placed alongside associated flow chart steps in FIG. 4.
Figure 4:
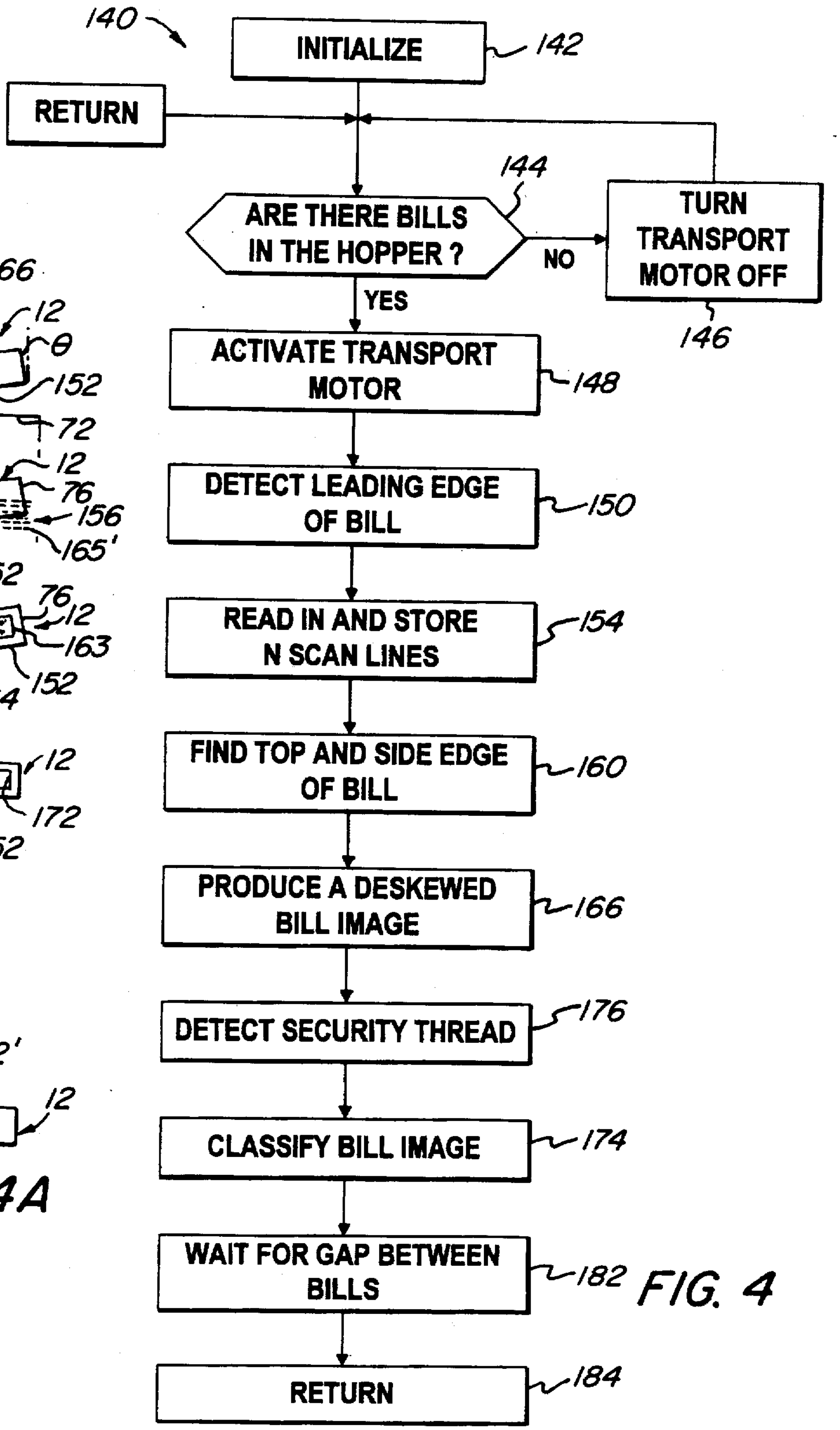
FIG. 4 is a flow chart of the various routines in accordance with the invention for use in the determination of the denomination of currency bills.
Figure 5B:
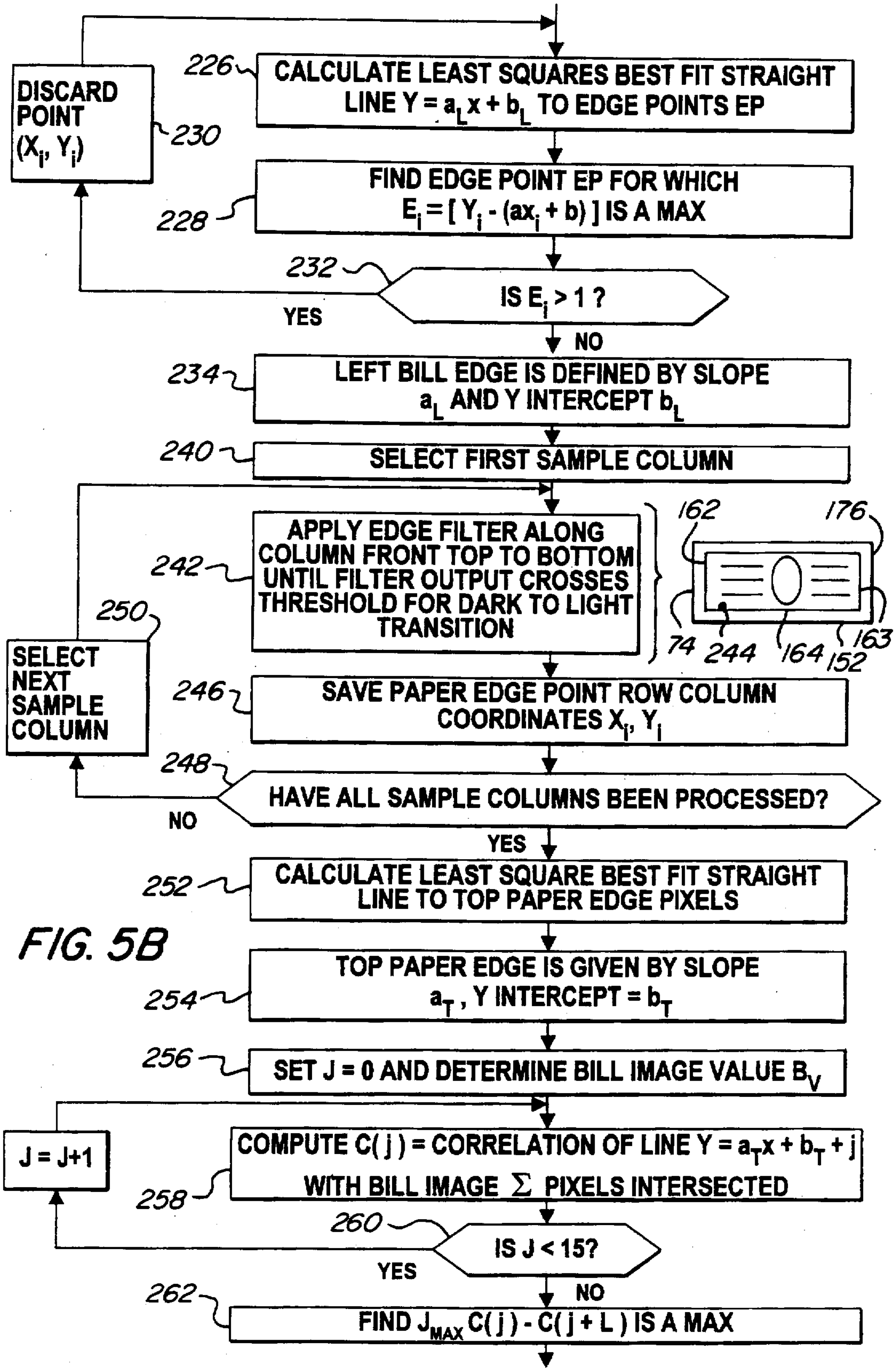
FIGS. 5A–5D are more detailed flow charts for routines shown in FIG. 4.
Figure 5C:
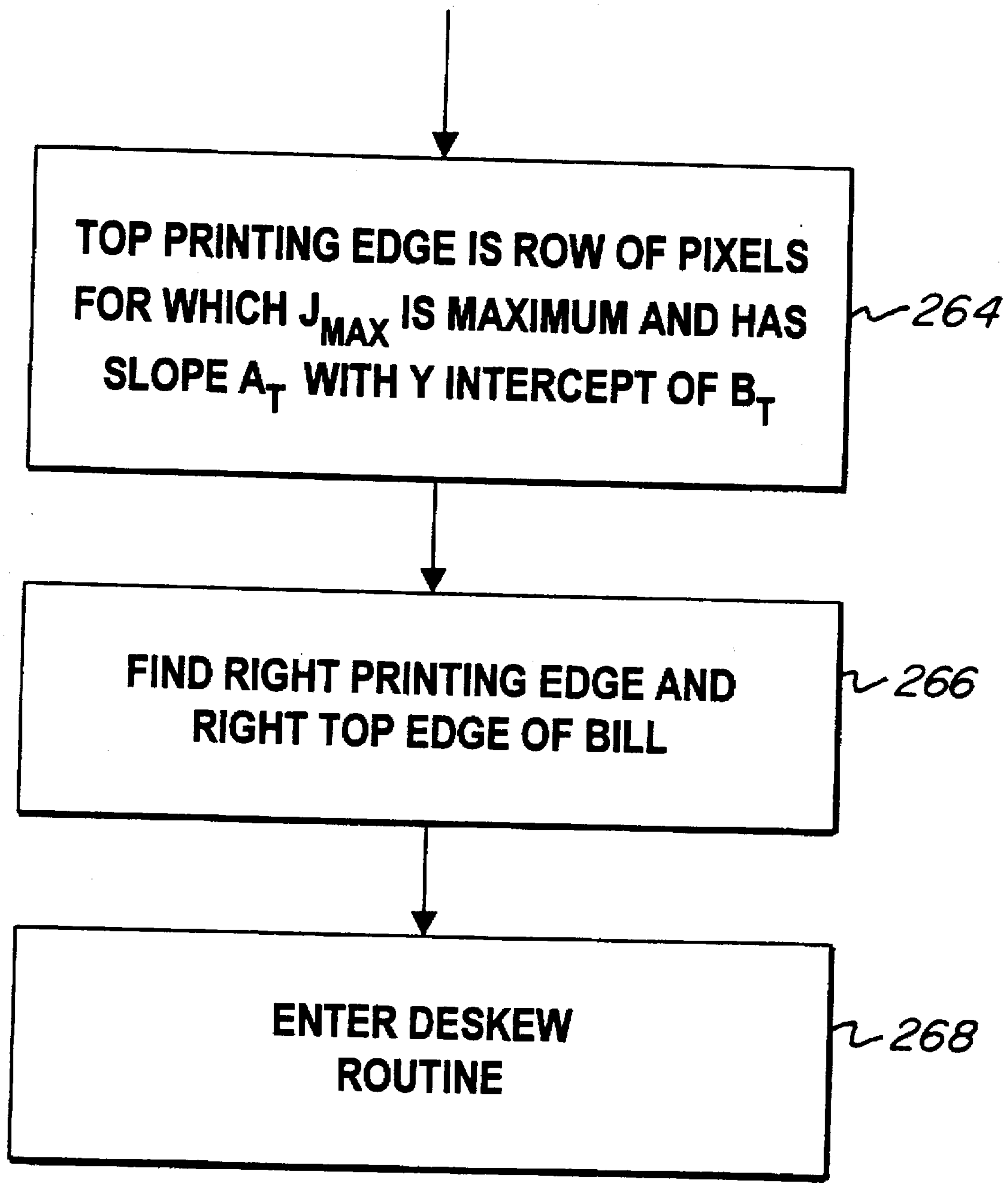
Figure 5D:
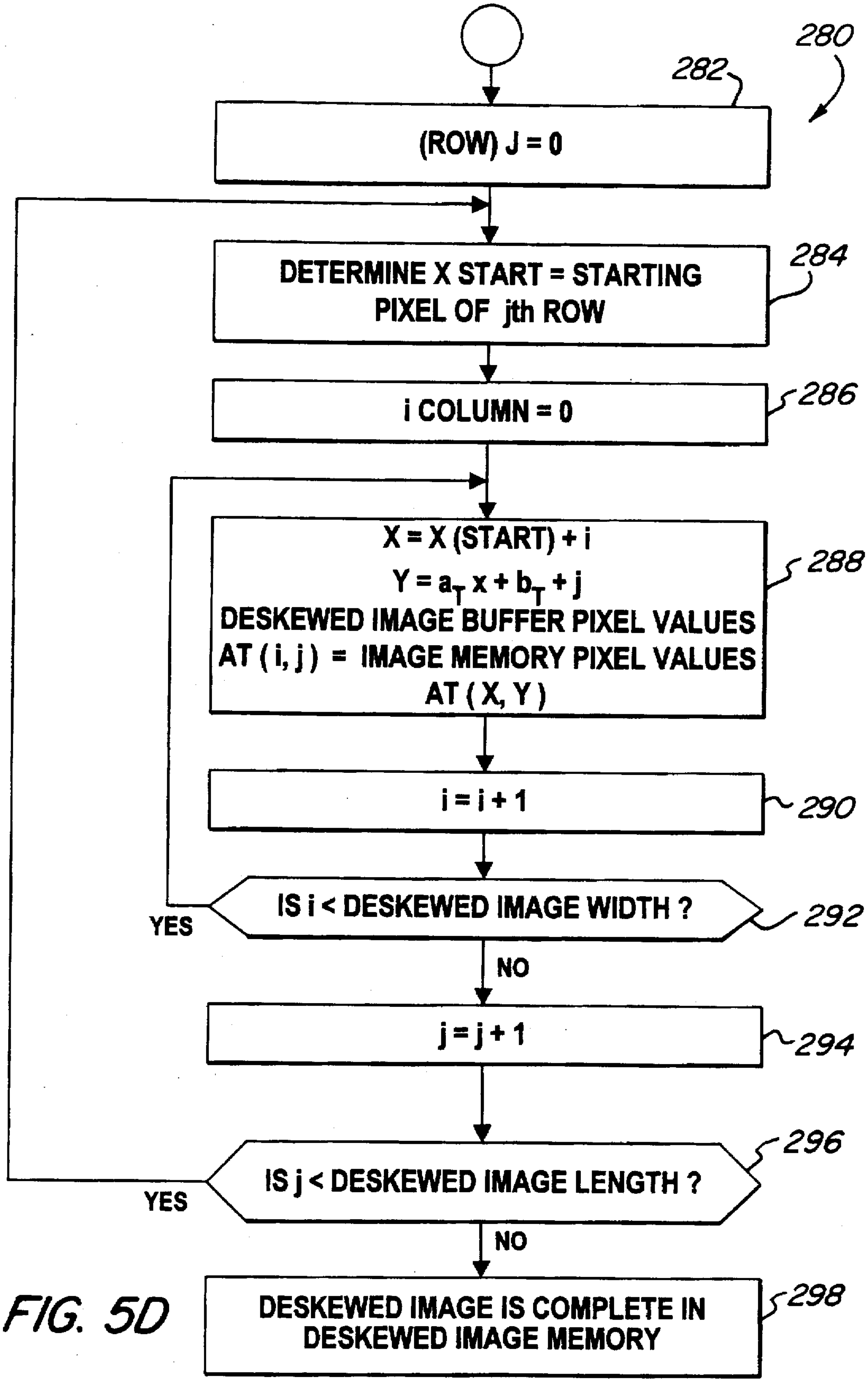

The process for use in bill denomination recognition in this invention is generally illustrated in FIG. 4 where a summary of a routine 140 for CPU 64 is shown. At 142 initialization steps are undertaken. Typically, this involves, among other steps, self tests, and the loading of coefficient values, gain and adjustment values for the CCD light pixel detectors and whether the operation is for the counting of bills of diverse or single denominations. Once the system is turned on an initial step at 144 is to determine whether a stack of bills 12 is in hopper 14. If not, the transport motor is turned off at 146 such as by outputting a disable signal on line 124 in FIG. 1.

In the event there are bills 12 in hopper 14, the transport motor is activated at 148 and the transport roller 20 begins or continues to rotate. At 150 a routine is entered to detect the presence of a leading paper edge 152 of a bill 12. After the transport motor is turned on or during the time between bills 12, there is a delay before a bill 12 reaches the windows 24, 24' along feed path 18. Hence, many digital scan lines are generated before a bill appears. These scan lines are not stored and discarded by CPU 64 until pixels representative of white light values are detected, corresponding to a leading edge 152 of a bill 12.

Since as shown in FIG. 4A adjacent step 150, a bill 12 may be skewed relative to the travel direction 66, the leading paper edge 152 is detected by identifying that a certain number of pixels in a scan line have changed from a value representing a dark image to a value representing a light image.

As soon as a leading paper edge 152 has been detected, at 154, a predetermined number N of digital pixel scan lines 156 are read in in synchronization with the strobe signals on line 124 in FIG. 1. The number of scan lines 156 is selected commensurate with that needed to enable bill denomination determination while accommodating different skew angles θ. Generally, when a higher skew angle is encountered, such as 30°, a larger number of scan lines is needed to assure the detection of a bill image of a certain size. In one embodiment, 128 scan lines 156 are read in, 64 for each side of a bill. At a vertical or path length resolution of 40 dpi, 64 scan lines are equivalent to about one and a half inches along the travel path 18. The digital pixel scan lines 156 are stored as an array in a memory segment of CPU 64.

Bills 12 traveling through the document counter device 10 may not be centered in the feed path 18. Also, the bills 12 may be rotated so that the long leading edge 152 is as much as 30 degrees from the perpendicular to the feed direction. Before the bill image can be classified, the bill image must be unshifted and deskewed, both being referred to herein as deskewed. Since there are no registration marks on U.S. currency, the edges of the printed area of the bills 12 are used to form a basis for deskewing the bills images. The paper edges cannot be relied upon to deskew the image because the printed area is not consistently registered with respect to the paper edges.

At 160 a routine is entered to find the leading or longer top edge and both left and right side or short edges 162, 163 of the printing pattern on a bill 12 within the group of scan lines 156. This is done by first determining which pixels signals represent the top paper edge 152 and the side printed edges 162, 163, and then the pixels defining the top printing edge 164 located parallel to the top paper edge 152. Definition of the edges, whether for the paper or the printing, can be made by way of a straight line equation using values for the slope and intercept and referenced to one of two coordinate systems having origins at predetermined locations, such as scan corners 165, 165'.

Once the orientations of printing edges 162, 163 and 164 have been determined, i.e. signals representative thereof are stored in memory, all of the digital pixel signals representative of the scanned printing of the associated bill 12 are found and used at 166 to deskew the stored bill image. This step involves extracting all of the pixel signals representative of the bill's printing surface commencing with an array of pixels bounded by the side edges 162 and top edge 164 and placing these in image memory 116 as a deskewed array. In essence, the deskewed pixel signals in memory 116 represent corner images of the printing only of a bill and thus can be rapidly accessed for subsequent bill denomination classification at 174.

A bill classification can be done using a variety of known techniques. In the instant case, a linear discriminant technique is employed. Linear discriminant techniques are described in "Pattern Classification and Scene Analysis" by Duda and Hart, published by Wiley & Sons in 1973.

At 176, a routine is entered to detect a security thread 36. With reference to FIG. 1 the pixel signals from CCD scanner 102 are also applied through a multiplexer 178 and A/D converter 180 to CPU 64 when a bill 12 passes between light source 38 and scanner 102. The presence of a security thread 36 is determined using skew or alignment information derived from the pixel signals in the image memory 116. Thus, the identification of the printing edges 162, 164 in the image memory is used to access those pixel signals derived with scanner 102 to determine the presence or absence of a security thread 36.

At step 182, the detection of a gap or the trailing edge 152' of a bill 12 is detected by monitoring the digital scan lines entered from A/D converter 62 and detecting when all of the pixel signals in a scan line have changed in value from light to dark. A return is then made at 184 to step 144.

FIGS. 5A–5D illustrate with greater detail the routine shown in FIGS. 4 and 4A. Thus, at 200 a scan line 156 of N pixel signals is read in and placed at the top of an image buffer in memory 114. Typically, each half of the bill image, i.e. the left and right sides, is 64 pixels wide by 68 scan lines long. The pixel values may have, for example, a range from a low value indicative of black to a high value representative of white. A test is then made at 202 whether more than a predetermined number of pixels in the stored scan line has a value that signifies a transition from dark to light or is greater than a predetermined value $K_w$. A pixel is considered white if its value is greater than a threshold value equivalent to values representative of the black background of the transport roller. If the test 202 is negative, a return is made to step 200; if positive, then the top paper edge of a bill 12 is presumed to have been found with the last scan line, which is so tagged at 204.

At 206 a subroutine is entered to read in and assemble an array of pixel signals by storing N, which typically is 128, scan lines in synchronization with the strobe pulses on line 82. At step 208 a next scan line is read in containing n pixel signals at buffer position RN. If a strobe pulse has not occurred as tested at 210 by examining the associated strobe interrupt input of CPU 64, then the next scan line is read in at 208. Once a strobe pulse has been sensed and these occur every time the transport wheel 20 moves about 2.5 degrees, the value RN is incremented. The strobe interrupt is cleared at 211 provided the requisite number N of scan lines has not yet been read in as tested at 212. Each pixel signal P(i,j) in a scan line is immediately adjusted for gain and offsets associated with the CCD element which provided the pixel signal. These values are calibration values used to compensate for variations in illumination, optical fidelity and the sensitivity of the CCD element from which the pixel signals was derived. Techniques for compensation of pixel signals from elements in an optical detector are known and have been published.

Once the N scan lines have been read in the bill's printed side edges 162, 163 of a bill 12 are located using a subroutine 214. This subroutine is similar for both edges 162, 163 and thus is shown here only for left edge 162. Both left and right printing edges can be found in successive sequences. At 218 a first set of three sample rows of pixel signals is extracted from the image buffer. An edge filter is then applied at 220 to the row of pixels to detect the position and pixel representative of a transition from light to dark.

The position coordinates of the transition pixel is stored as $x_i\, y_i$ using the coordinate system having its origin at corners 165 for the left printed edge 162 and 165' for the right printed edge 163. All the sample rows or scan lines 156, typically eight spaced apart by five scan lines, in the image buffer are examined in that manner as tested at 222. Edge filters to locate the transitions are well known in the art and many can be employed. One filter used is known as a Sobel edge filter using a standard 3×3 pixel digital filter that produces a high output when a light-to-dark or dark-to-light transition in the image is filtered.

The finding of, for example the left edge, commences by calculating at 226 a least squares best fit straight line $y=a_Lx+b_L$ to the transition or edge pixels or edge points EP. At 228, the edge pixel which lies farthest from the best fit straight line is found. This is discarded at 230 as an outlier if its distance is greater than a set value. When, as tested at 232, there is no pixel that lies farther from the last best straight line than a certain value, the left bill's printed edge 162, is defined at 234 by orientation signals representative of this last straight line having a slope $a_L$ and y intercept of $b_L$. Other techniques can be used to find the printing edge.

A similar process is carried out to determine orientation signals representative of the location of the right printed side or short edge 163 so that this is defined by a straight line having a slope $a_r$ and a y intercept of $b_r$ referenced to the coordinate system applicable to the right side of the bill.

At 240 a routine is entered to detect the location and orientation of the top printing edge 164. This is more difficult than finding side edges 162, 162' because the longer or top printing edge 164 is not well defined on all U.S. denominations and the bill's motion along path 18 tends to smooth out the top edge 164. The top printing edge 164 is found by first determining a best fit line along the leading paper edge 152. Then the bill image is correlated against a line that is stepped away from the paper edge 152. The particular stepped line whose pixels represent the greatest change in the correlation from the previous line is identified as the transition from light (the border zone near leading edge 152) to dark corresponding to the top or longer printed edge 164 of a bill 12.

At 240, a first column of pixels is selected. An edge filter is then applied at 242 to detect the pixel signal and its location where its value is representative of a transition from dark to light. This pixel is identified and saved at 246 as a top edge point such as 244 with appropriate coordinates $x_i$, $Y_i$.

Since not all of the sample columns have been processed, as tested at 248, the process is repeated for another column which can be spaced from the first such as by 8 pixels and is selected at 250. This process is repeated for say eight columns, though more can be used, so as to store at 246 a number of paper edge points representative of paper edge 152.

A least square best fit straight line determining process similar to that as described for deriving the printed side edges 162, 163 is then performed at 252 to the paper edge defining transition pixels saved at 246 until at 254 the top paper edge can be defined by a straight line with a slope $a_T$ and a y intercept of $b_T$.

The pixels lying along successive lines parallel to the top paper edge 152 are then correlated with a value representative of the bill's image. This bill image value can be obtained for example by summing at 256 pixel values lying along a line which is parallel to the top edge 152 but are known to be within the bill's printed area. For example, a line which is a quarter inch from the top paper edge can be expected to represent the printed surface.

At 258 a correlation process is begun by correlating successive lines incremented from and parallel to the top paper edge 152 with the bill image value $B_v$. The correlation process can take many forms but preferably involves summing the pixel signal values in a row parallel to the top edge 152 and comparing this sum C with the previous line's sum. This is done for a predetermined number of rows, e.g., 15, as tested at 260.

The correlation values C of a row of pixels which shows the largest change from the value C for the next row is found at 262 and signifies the top printing edge 164 with a slope $a_T$ and Y intercept $b_T$ for the left side of a bill as shown.

The processes of finding the right printing edge 163 and the top printing edge 164' on the right side of a bill 12 are carried out in a similar manner at 266. Hence, at 268 a deskew routine is entered to produce a bill image whose pixels represent the left and right side of a bill 12.

In the deskewing routine 280, all image pixels representative of the detected printed side edge and those along parallel columns as delimited by the pixel signals lying along the top edge 164, are derived and stored in image memory 116 as a deskewed array of pixel signals. Rows of skewed pixels are identified by the variable j and columns by the variable i.

At 282 j is set to zero and at 284 a starting skewed pixel is defined. The column variable i is set to zero at 286 and at 288 a variable x is determined as equal to $X_{start}$+i, the variable y is set and the deskewed image memory values at x and y are determined and stored. If necessary, a rounding to the nearest pixel value is done.

At 290 the i column variable is incremented and at 292, a test is made whether the value for i is still less than the width of the deskewed image. If so, then the next deskewed pixel value for the same row is determined, etc. until test 292 indicates that all of the pixel values for that row have been deskewed.

At 294 the row variable j is incremented and as long as the value for J does not exceed the length of the image as tested at 296, the previously described deskewing process repeated for the pixel values in successive rows. Once the test result from step 296 is positive, the deskewing process has been completed and deskewed pixel values reside in image memory 116 at step 298. The bill's deskewed image may be reduced from 64 pixels wide by 58 scan lines long to 50 pixels by 50 scan lines. This is the size of the bill image or the size of the deskewed array that is used to enter the denomination determining routine.

Figure 6:
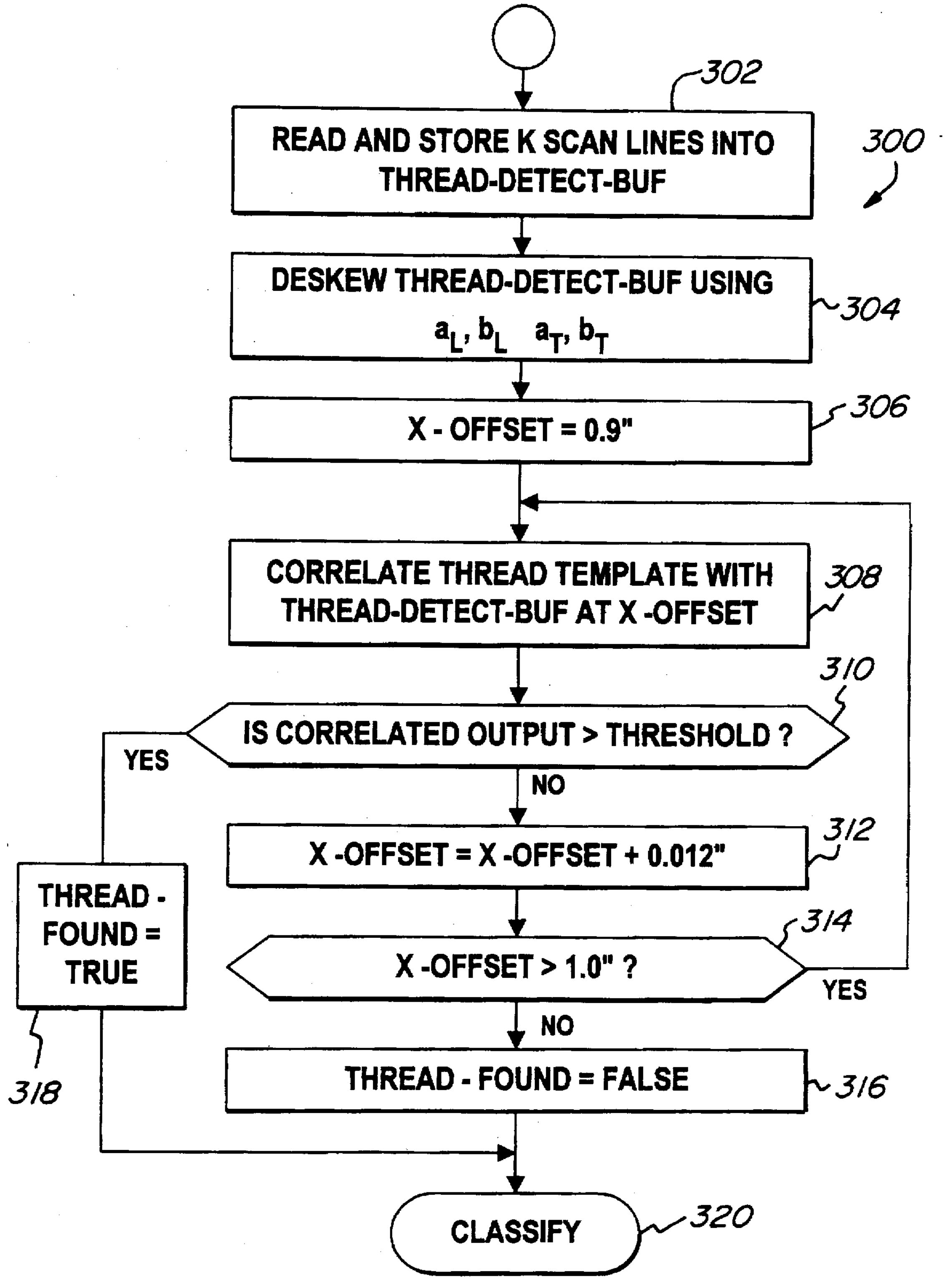
FIG. 6 is a flow chart for detecting the presence of a security thread.
Figure 5A:
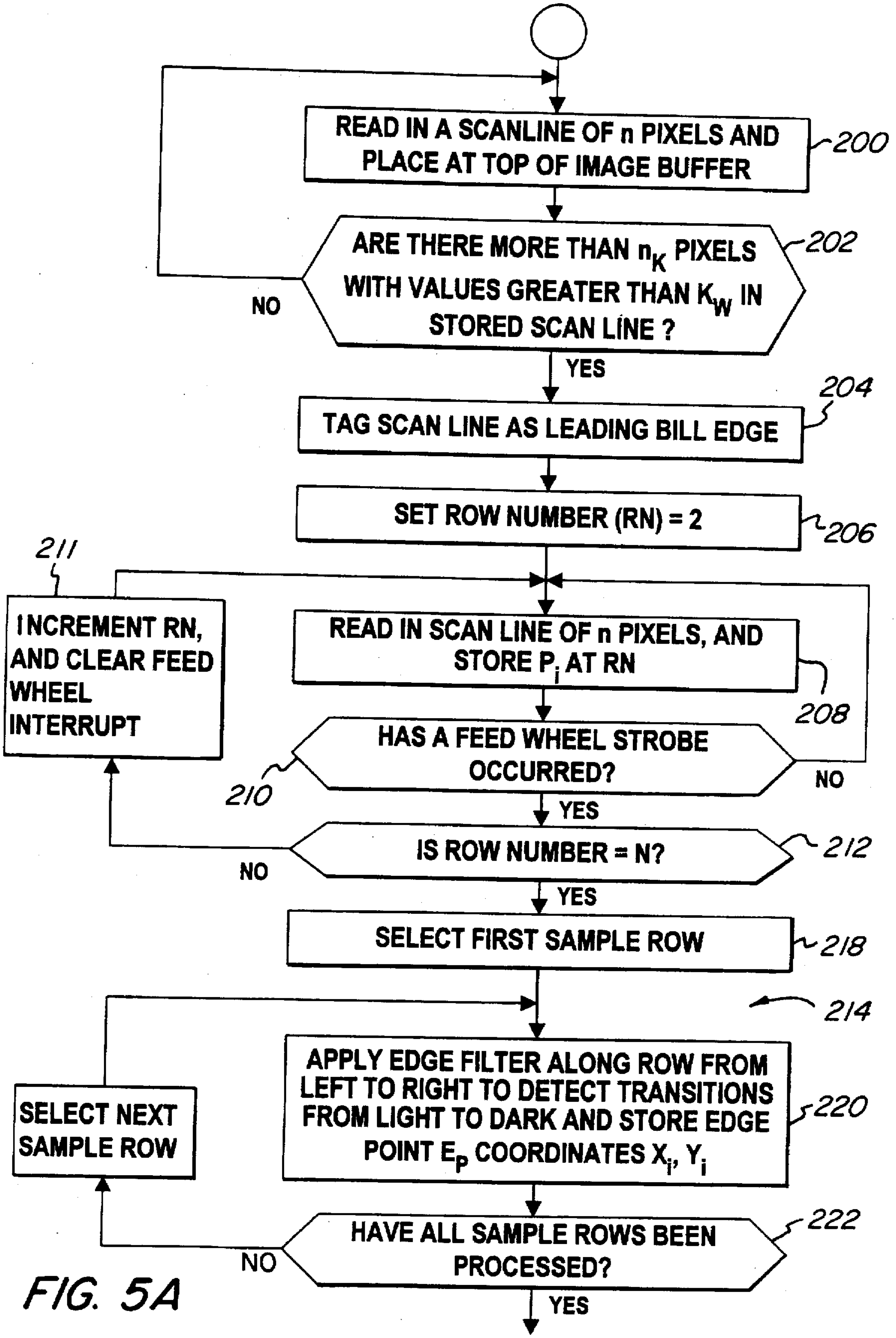

The detection and verification of a security thread 36 can be implemented with a process 300 as set forth in FIG. 6. At step 302, a predetermined number of scan lines of pixel signals from A/D converter 180 (see FIG. 1) are read into a thread detection buffer when the leading paper edge 152 is detected through windows 26, 26' in a manner similar to step 202.

The pixel signals in the thread detection buffer are deskewed at 304 using the previously determined values for the left and right printing edges $a_L$, $b_L$, $a_R$, $b_R$ and top printing edge $a_T$, $b_T$. A lateral offset value slightly less than the expected location (of 0.95") of the security thread is then set at 306. Typically, this lateral offset is at about 0.9 inches.

Commencing at the $X_{OFFSET}$ lateral location, a correlation technique is executed at 308 between the pixel signals in a small zone and a preselected template set of values for the thread. Such template can be a set of average image pixel values corresponding to the transmittance profile of a security thread.

A test is then made at 310 whether the correlation determined at 308 exceeds a preselected threshold value. If not, the lateral offset is incremented at 312 and as long as the offset does not exceed a maximum, of say, one inch and tested at 314, the search for a security thread is continued at step 308. If the lateral offset exceeds the maximum, then the routine 300 is exited at 316 with a flag indicating that no security thread has been found.

In the event the correlation threshold value is exceeded as determined by test 310, then an indication of the presence of a security thread is provided at 318. An advance to the next step in the processing of a bill's scan lines is made at 320 for determination of a bill's denomination.

Classification of a bill image as stored in image memory 116 involves one of 28 groups for U.S. currency. Namely, $1, $2, $5, $10, $20, $50 and $100 bills need to be recognized in each of four orientations. These orientations are referred to as front (f), back (b), front upside-down (fu), and back upside-down (bu).

Linear discriminant-functions are used to classify the bill image. A linear discriminant function g has the form:

$g=wO+\Sigma w(i,j)\ p\ (i,j)$, for i=1 to N and for j=1 to K.

p(i,j) are the deskewed image pixel signals while wO, w(i,j) are coefficients for the function g. Linear discriminant functions are efficiently implemented in digital signals processors and much literature exists describing methods to generate the w coefficients.

A straightforward multi-category application of linear discriminant functions would use 28 functions $g_x$ where X is one of $\theta$={$1, . . . , $100f, $1fu, . . . , $100fu, $1b, . . . , $100b, $1bu, . . . , $100bu}. Then the image would be classified as $X_{max}$ when $GX_{max}$>GX for all X $\epsilon$ $\theta$. This approach does not work well for U.S. currency because the sample images are not linearly separable with good decision margins.

The multi-category application of linear discriminant functions used in this algorithm is hierarchical. The hierarchical approach offers better discrimination and faster speed, but requires more memory for storing additional g functions. The actual hierarchial structure used depends upon the currency scanned. For example, the structure for U.S. dollars will be different from the structure for Canadian dollars and which in turn will be different from the structure for Dutch guilders etc. Clustering techniques for determining a good hierarchial structure are well known (see Hierarchial Clustering Section 6.10 in Pattern Classification and Scene Analysis by Duda and Hart, John Wiley 1973).

Figure 7:
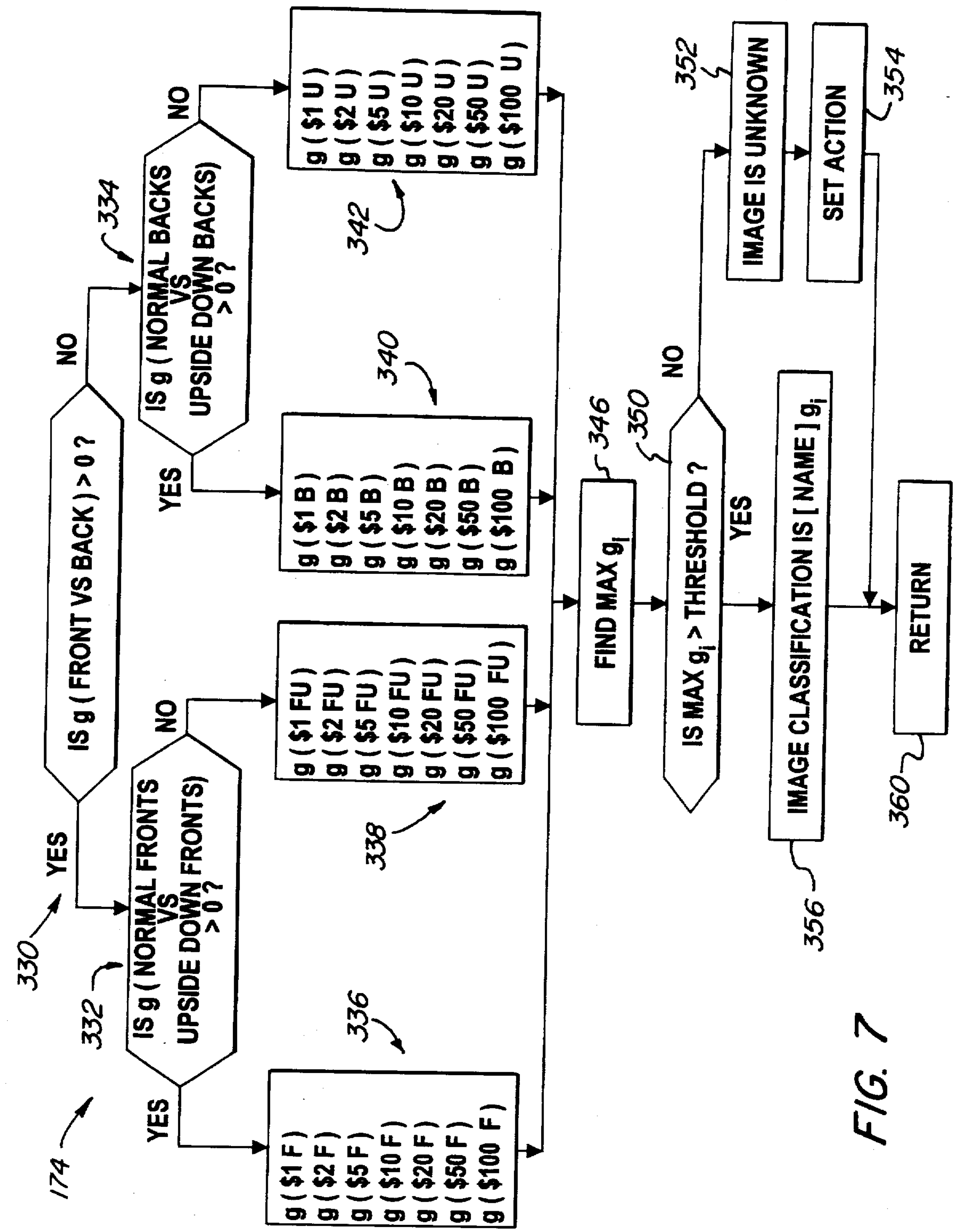
FIG. 7 is a schematic flow diagram and a flow chart for classifying a bill image.

An example hierarchical structure is shown at 174 in FIG. 7. The deskewed bill image is first applied at 330 to determine a root-node linear discriminant function g(o) (normal front vs. normal back). If the result is positive, the left hand branch 332 is followed; if the result is negative, the right hand branch 334 is followed. This process continues until one of the leaf branches, 336, 338, 340, 342 is reached.

At leaf branches, several functions may be applied to generate evaluation signals respectively associated with each denomination. The largest result is identified at 346 and determines the image category. The same process is employed for both the left and right sides of a bill and the results combined at 346..

Each node, such as 330, 332, 334 in FIG. 7 of the hierarchial decision tree has associated with it a discriminant function, which is just a set of 2501 coefficients, as well as other information describing the tree structure. This includes the node name, the number of siblings involved below the node, and the left and right child address. The value of the current node discriminant function is determined by applying the current node's 2500 coefficients to the 2500 pixels in the deskewed image buffer and adding the value WO.

For example, suppose a $5b is scanned. In FIG. 7, applying the $5b deskewed image to g (front vs. back) at 330 would produce a negative result. Following the right branch, g (normal backs vs. upside-down backs) at 334 would be applied, and the result would be positive. The left branch 340 would then be followed, and g ($1b) through g ($100b) would be applied. Assuming the image is correctly identified, the largest result would be produced by g ($5b).

The example hierarchical structure in FIG. 7 is approximately three times faster than the straightforward approach; it requires only nine function applications versus 28 in the straightforward approach.

Once the maximum value for g from one of the leaf branches has been determined, it is compared at 350 with a threshold value $g_k$. This threshold level is set to assure that the bill image at least approaches the appearance of a normal bill and that the classification process has a minimum level of validity. Hence, if the test result of step 350 is negative, the image is identified as unknown at 352, and if necessary, at 354 an action is undertaken such as the display of an error or the diversion of the unclassified bill to a discard hopper or stopping of the machine or employing a special bill marking.

When the threshold level $g_k$ is exceeded at 350, the bill's appropriate classification as well as its orientation is noted at 356, and if necessary, appropriate action taken in the sorting of the identified bill and its discharge in the correct hopper or incrementing a count if the apparatus is used as a counter.

Figure 8:
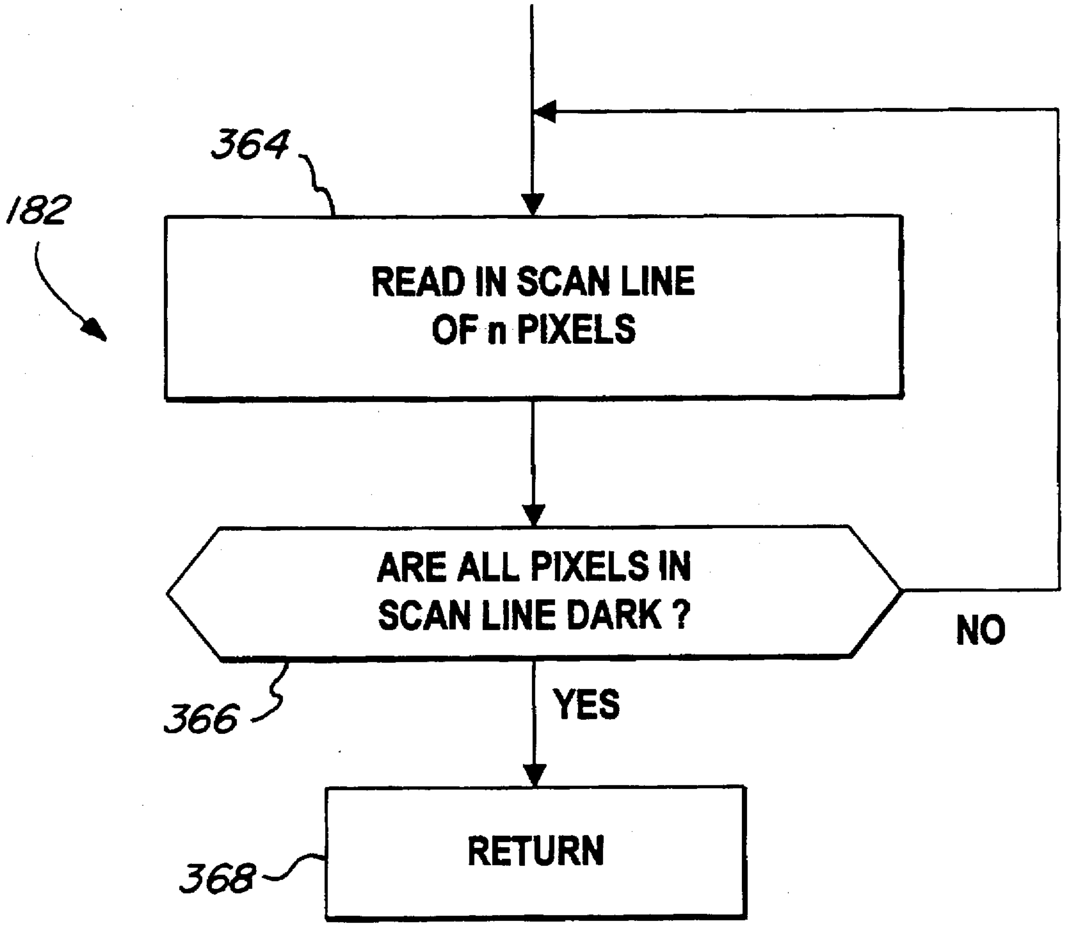
FIG. 8 is a flow chart for detecting the trailing edge of a bill.

At 360 a return is then made from the classifying routine to detect the occurrence of a gap between bills 12 using the routine 182 in FIG. 4 and as more particularly shown in FIG. 8. The detection of a gap involves a detection that all pixel values read in for a scan line represent dark values. Thus, at 364 in FIG. 8 a scan line of n pixels, typically 128, as read in and at 366 the pixel values are checked by comparing them to a threshold level representative of a dark value. If at least one pixel has a light value, a return is made to step 364. If all the pixels in a scan line are dark, then the start of a gap between bills is deemed to have been found and a return is made at 368 to the top of routine 140 in FIG. 4 at 144.

Having thus described an apparatus and technique for use in determining currency denomination in accordance with the invention, its advantages can be appreciated. Variations from the described embodiment can be made without departing from the scope of the invention as set forth in the following claims. For example, the longer dimension of bills can be oriented parallel with the direction of travel so that the top or leading printed edges of bills are the shorter bill's dimension. Skew detection can employ a plurality of sensors as taught by the O'Maley patent. In foreign currencies, a precise printed edge may not be available and a paper edge may be used instead to determine the start of the bill's printed surface.

I claim:

1. A method for use in the automatic rapid recognition of denominations of paper currency for currency counting by feeding currency bills along a travel path at a fast rate, comprising the steps of:

scanning light reflected from a bill's surface along regions thereof which include at least laterally spaced-apart corner regions, each corner region including a crosswise paper edge which is oriented to lie across the travel path and wherein each corner region further extends across a lateral paper side edge of the bill as the bill moves along the travel path and generating pixel signals representative of light pixels in the bill corner regions;

assembling an array of pixel signals in a memory as representative of an image of bill corner regions;

deriving from said array of pixel signals, pixel signals representative of a desired deskewed image of portions of the printed surface in said bill corner regions; wherein said deriving step for deskewing said array of pixel signals comprises:

finding first and second pixel signals in the array and representative of first and a second parallel printing side edges of the printing on the bill's surface at corner regions of the bill;

determining pixel signals in the array and which are representative of a bill's crosswise paper edge, and which is generally transverse to said first and second printing side edges;

generating a reference value for a line of pixel signals in the array and known to lie within the printing surface of the bill and parallel to said bill's paper edge;

comparing corresponding values of successive rows of pixel signals from the array and which lie along lines that are parallel to said bill's crosswise paper edge to said reference value;

and determining from said comparing step when a row of pixel signals within the array is representative of a crosswise printing edge which is adjacent to and parallel to said crosswise paper edge; wherein third pixel signals representative of said latter row identify said crosswise printing edge as parallel to said crosswise paper edge; and referenced to said first, second and third pixel signals, deriving from said array of pixel signals a second array of pixel signals which is representative of a deskewed image of said printings in said bill corner regions with said latter printings being bounded by said first and second printing side edges and said crosswise printing edge.

2. The method as claimed in claim 1 wherein said finding step comprises the steps of:

detecting a plurality of spaced apart pixels representative of the printing along side edges of the bill;

generating straight lines which best approximate alignments of the latter spaced apart pixels along said respective straight lines;

selecting those spaced apart pixels which lie within a predetermined distance from said straight lines;

and repeating said straight line generating and selecting steps until all remaining spaced apart pixels lie within said predetermined distance; and identifying those pixels which lie along straight lines for which all remaining spaced apart pixels lie within said predetermined distance as representative of side edges of the printing on said bill.

3. The method as claimed in claim 1 and further comprising the steps of:

scanning light passed through a bill and producing second pixel signals representative of pixels of light passed through at least first and second bill portions located to overlap a security thread within a bill;

selecting from said second array of pixel signals arrays of second pixels representative of light pixels aligned parallel to said printed side edges of a bill; and comparing said selected arrays of second pixels with reference pixels representative of an image of light passed through a portion of the bill including the security thread to determine whether a security thread is present in said bill.

4. An apparatus for use in the automatic recognition of denominations of paper currency by feeding currency bills along a travel path for detecting light reflected from a surface of the bills comprising:

light-sensing means positioned alongside the travel path and having a beam width selected and oriented to scan a region which extends across a side edge of a bill as it moves along the travel path, said light-sensing means, producing a plurality of pixel signals representative of object pixels from the bill;

means responsive to said pixel signals for detecting a leading paper edge of a bill;

means for storing pixel signals produced after detection of said leading paper edge in an array which is representative of said scanned region of the bill;

means for determining the orientation of a first printed edge of the bill from said stored pixel signals and producing first orientation signals representative thereof;

means for deriving from pixel signals the orientation of a paper edge of a bill;

means for comparing stored pixel signals associated with successive groups of pixels representative of object pixels lying along lines parallel with the orientation of the paper edge with a group of pixel signals representative of the printing on the surface of the bill for detecting a second printed edge, which is transverse to said first printing edge, and producing comparison signals indicative thereof;

means responsive to said comparison signals for determining which successive groups of pixel signals represent a light-to-dark transition of object pixels and produce second orientation signals indicative thereof; and means responsive to said first and second orientation signals for determining stored pixel signals representative of a deskewed image of the printed region of the bill.

5. An apparatus for use in the automatic recognition of denominations of paper currency by feeding currency bills along a travel path for detecting light reflected from a surface of the bills comprising:

light-sensing means positioned alongside the travel path and having a beam width selected and oriented to scan a region which includes side edges of a bill as it moves along the travel path, said light-sensing means producing a plurality of pixel signals representative of object pixels from the bill;

means responsive to said pixel signals for detecting a leading paper edge of a bill;

means for storing pixel signals produced after detection of said leading paper edge in an array which is representative of said scanned region for the bill;

means for determining the orientation of a first printed side edge of the bill from said stored pixel signals and producing first orientation signals representative thereof;

means for determining the orientation of a second printed side edge of the bill from said stored pixel signals and producing second orientation signals representative thereof;

means for determining which pixels in the array are representative of a paper edge of the bill to which the array relates and which is generally transverse to said printed bill side edges, and for deriving from said paper edge representative pixel signals, third orientation signals indicative of the orientation of the paper edge, means for selecting pixel signals representative of lines that are parallel to the orientation of said paper edge and deriving from said selected pixel signals those pixel signals indicative of the transition of an unprinted border of the bill to the printed surface of the bill; and means limited by said first and second orientation signals and by those pixel signals indicative of said transition for extracting, from said stored pixel signals, those stored pixel signals which are representative of deskewed images of corner regions of the printed region of the bill.

6. The apparatus as claimed in claim 5 and further comprising:

means responsive to the first and second orientation signals for generating an array of pixel signals representative of a deskewed image of the scanned region of the bill.

7. The apparatus as claimed in claim 6 wherein said means for generating an array representative of said deskewed image comprises:

means for deriving, from said array, pixel signals which lie along orientations which are parallel to those pixels which are indicative of the transition from the unprinted border to the printed surface of the bill and are representative of light object pixels from the bill's printed surface at least at corners of the bill.

* * * * *